(12) United States Patent
Watts et al.

(10) Patent No.: US 9,616,472 B2
(45) Date of Patent: Apr. 11, 2017

(54) OXIDATION OF CONTAMINANTS

(75) Inventors: Richard J. Watts, Pullman, WA (US); Mushtaque Ahmad, Pullman, WA (US)

(73) Assignee: Washington State University, Pullman, WA (US)

( * ) Notice: Subject to any disclaimer, the term of this patent is extended or adjusted under 35 U.S.C. 154(b) by 227 days.

(21) Appl. No.: 14/128,311

(22) PCT Filed: Jun. 17, 2012

(86) PCT No.: PCT/US2012/042849
§ 371 (c)(1),
(2), (4) Date: Dec. 20, 2013

(87) PCT Pub. No.: WO2012/177526
PCT Pub. Date: Dec. 27, 2012

(65) Prior Publication Data
US 2014/0116960 A1 May 1, 2014

Related U.S. Application Data

(60) Provisional application No. 61/501,059, filed on Jun. 24, 2011.

(51) Int. Cl.
*B09C 1/08* (2006.01)
*C02F 1/66* (2006.01)
(Continued)

(52) U.S. Cl.
CPC .................. *B09C 1/08* (2013.01); *B09C 1/00* (2013.01); *C02F 1/66* (2013.01); *C02F 1/72* (2013.01);
(Continued)

(58) Field of Classification Search
CPC .... C02F 1/66; C02F 1/72; C02F 1/722; C02F 1/725; C02F 2101/36; C02F 2101/363;
(Continued)

(56) References Cited

U.S. PATENT DOCUMENTS 3,901,819 A * 8/1975 Nakagawa ............. C11D 3/391
252/186.38
5,151,212 A * 9/1992 Bell ........................ C11D 3/391
252/186.38
(Continued)

FOREIGN PATENT DOCUMENTS

EP 0448337 6/1995

OTHER PUBLICATIONS

International Search Report and Written Opinion issued Jan. 29, 2013, in International Application No. PCT/US2012/042849.
(Continued)

*Primary Examiner* — Lucas Stelling
(74) *Attorney, Agent, or Firm* — Whitham, Curtis & Cook, P.C.

(57) ABSTRACT

Various embodiments of contaminant removal systems, compositions, and methods are described herein. In one embodiment, a method for oxidizing a contaminant includes contacting the contaminant with a peroxygen compound and initializing, maintaining, or propagating degradation of the peroxygen compound with an oxygenated organic compound, thereby releasing oxidizing radicals. The method also includes oxidizing the contaminant with the released oxidizing radicals.

24 Claims, 8 Drawing Sheets

(51) Int. Cl.
 C02F 1/72 (2006.01)
 B09C 1/00 (2006.01)
 C02F 101/32 (2006.01)
 C02F 101/36 (2006.01)
(52) U.S. Cl.
 CPC ........ *C02F 1/722* (2013.01); *C02F 2101/322* (2013.01); *C02F 2101/36* (2013.01); *C02F 2101/363* (2013.01); *C02F 2305/02* (2013.01)
(58) Field of Classification Search
 CPC .. C02F 2101/322; C02F 2305/02; B09C 1/00; B09C 1/08; C11D 3/391; C11D 3/3912
 See application file for complete search history.

(56) References Cited

U.S. PATENT DOCUMENTS

| | | | | |
|---|---|---|---|---|
| 5,431,849 | A * | 7/1995 | Damhus | C11D 3/3912 252/186.38 |
| 5,437,686 | A * | 8/1995 | Heffner | C11D 3/391 252/186.38 |
| 7,029,588 | B2 | 4/2006 | Owens | |
| 7,785,038 | B2 | 8/2010 | Block et al. | |
| 2004/0197150 | A1 | 10/2004 | Bruell et al. | |
| 2008/0272063 | A1* | 11/2008 | Boulos | B09C 1/08 210/759 |

OTHER PUBLICATIONS

Ana Maria Ocampo, "Persulfate Activation by Organic Compounds," a dissertation submitted in partial fulfillment of the requirements for the degree of Doctor of Philosophy, Washington State University Department of Civil and Environmental Engineering, Aug. 2009, 88 pages.

Watts, R.J., Teel, A.L., 2006. Treatment of contaminated soils and groundwater using ISCO. Pract. Period. Hazard. Tox. Radio. Waste Manag. 10(1), 2-9.

Furman, O., Teel, A. L., and Watts, R. J. (2010). Mechanism of base activation of persulfate. Environ. Sci. Technol., 44(16), 6423-6428.

Huang, K. C., Couttenye, R. A., Hoag, G. H., 2002. Kinetics of heat-assisted persulfate oxidation of methyl tert-butyl ether (MTBE). Chemosphere 49, 413-420.

Huang, K. C., Zhao, Z., Hoag, G. E., Dahmani, A., and Block, P. A., 2005. Degradation of volatile organic compounds with thermally activated persulfate oxidation. Chemosphere 61, 551-560.

Watts, R.J., 2011 Enhanced Reactant-Contaminant Contact through the Use of Persulfate In Situ Chemical Oxidation (ISCO). SERDP Project ER-1498 Report.

Liang, C.J., Bruell, C.J., Marley, M.C., Sperry, KR, 2004. Persulfate oxidation for in situ remediation of TCE. I. Activated by ferrous ion with and without ampersulfate-thiosulfate redox couple. Chemosphere 55, 1213-1223.

Liang, C.J. Lee, I-L. Hsu I-Y. Liang, C.-P., Lin, Y.-L., 2008. Persulfate oxidation of trichloroethylene with and without iron activation in porous media. Chemosphere 70, 426-435.

Chenju Liang, et al., Hydroxypropyl-[beta]-Cyclodextrin-Mediated Iron-Activated . . . ,) Industrial and Eng. Chemistry Research, vol. 46, No. 20, Sep. 2007.

Kyoung-ho Song et al., "A Study on Persulfate Oxidation to Remove Chlorinated Solvents (TCE/PCE)," Korean Society of Environmental Engineers, 31(7), pp. 549-556.

Extended European Search Report issued in European Application No. 12803303.2, on Dec. 10, 2014, 3 pages.

Chenju Liang, et al., "Hydroxypropyl-â-Cyclodextrin-Mediated Iron-Activated Persulfate Oxidation of Trichloroethylene and Tetrachloroethylene" Industrial & Engineering Chemistry Research, vol. 46, No. 20, Sep. 2007, pp. 6466-6479, 14 pages.

* cited by examiner

OXIDATION OF CONTAMINANTS

CROSS-REFERENCE TO RELATED APPLICATION(S)

This application is a National Stage Application of PCT Application No. PCT/US12/42849, filed Jun. 17, 2012, which claims priority to U.S. Provisional Application No. 61/501,059, filed on Jun. 24, 2011.

STATEMENT REGARDING FEDERALLY SPONSORED RESEARCH

This work was supported in part by Strategic Environmental Research and Development Program # ER-1489. The government has certain rights in this work.

BACKGROUND

A well-documented problem in many countries is contaminated subsurface soil by volatile organic compounds (VOCs), semi-volatile organic compounds (SVOCs), pesticides, polychlorinated biphenyls (PCBs), polyaromatic hydrocarbons (PAHs), total petroleum hydrocarbons (TPH), and/or other contaminants. Such contaminants can become sources of water contamination. For example, certain toxic VOCs can move through soil by dissolving into water passing through. Examples of such toxic VOCs include trichloroethylene (TCE), vinyl chloride, tetrachloroethylene (PCE), methylene chloride, 1,2-dichloroethane, 1,1,1-trichloroethane (TCA), 1,1-dichloroethane, 1,1-dichloroethene, carbon tetrachloride, benzene, chloroform, chlorobenzenes, ethylene dibromide, and methyl tertiary butyl ether.

Many techniques have been developed for remediation of contaminated soil, groundwater, or wastewater. Example techniques include dig-and-haul, pump-and-treat, biodegradation, sparging, and vapor extraction. However, using such techniques to meet stringent clean-up standards can be costly, time-consuming, and ineffective for recalcitrant compounds.

DETAILED DESCRIPTION

Figure 1:
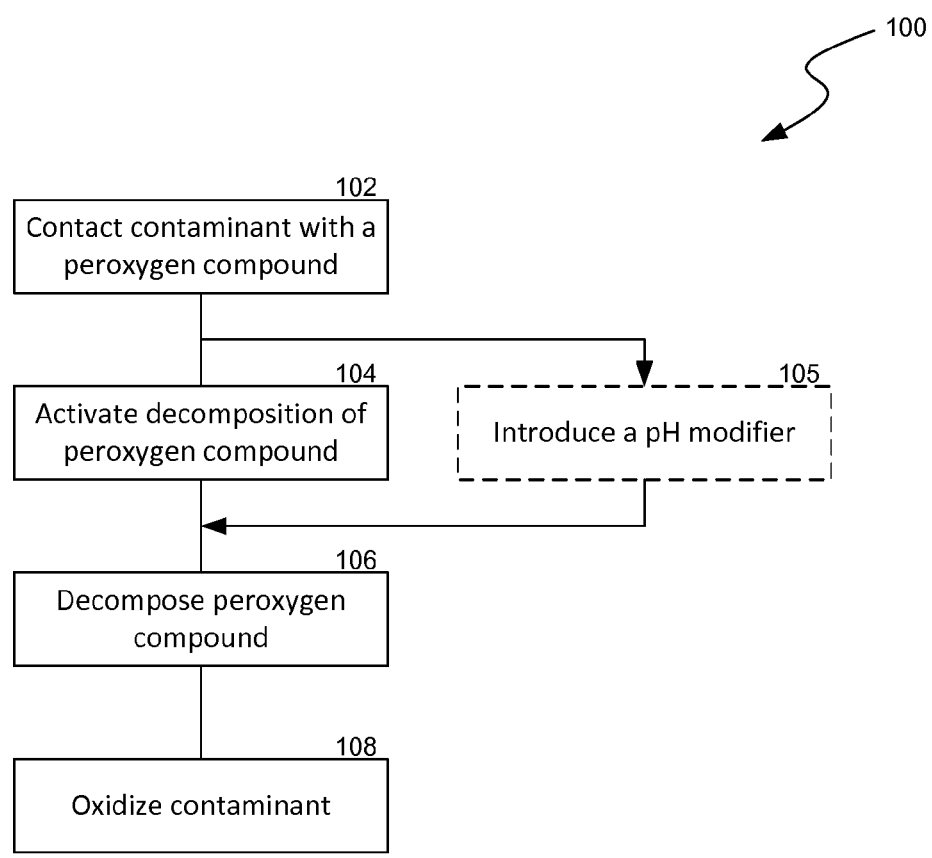
FIG. 1 is a flowchart illustrating a process for oxidizing a contaminant in accordance with embodiments of the technology.

Various embodiments of contaminant oxidation systems, compositions, and methods are described below. Particular examples are describe below for illustrating the various techniques of the technology. However, a person skilled in the relevant art will also understand that the technology may have additional embodiments, and that the technology may be practiced without several of the details of the embodiments described below with reference to FIGS. 1-7.

In situ chemical oxidation (ISCO) technology includes a group of chemical processes for treating contaminated soils and groundwater. Permanganate, catalyzed $H_2O_2$ propagations (CHP), and activated persulfate (e.g., $Na_2S_2O_8$) are oxidants that may be used in ISCO processes. Each of these oxidants has limitations. For example, permanganate has limited reactivity and may be consumed by natural organic matter. CHP is characterized by rapid hydrogen peroxide decomposition in the subsurface, which can limit contact period with contaminants.

Activated persulfate has a number of advantages over permanganate and CHP. Unlike permanganate, persulfate activation generates a suite of reactive oxygen species that can oxidize and/or otherwise degrade many organic contaminants. In addition, persulfate is more stable than hydrogen peroxide in subsurface soil. Persulfate can persist for weeks to months instead of hours to days for hydrogen peroxide to allow its transport down-gradient and increase the potential contact with contaminants.

To the best knowledge of the inventor, activation mechanisms of persulfate in subsurface soil are not well understood. Common persulfate activators include sodium hydroxide (NaOH) or transition metals, e.g., iron (II). However, both activation techniques have certain drawbacks. Without being bound by theory, it is believed that the iron (II) activation of persulfate is similar to a Fenton initiation reaction in which iron (II) mediates the decomposition of persulfate to sulfate radicals ($SO_4^{•-}$) and sulfate anions ($SO_4^{2-}$) as follows:

$$^-O_3S-O-O-SO_3^- + Fe^{2+} \rightarrow SO_4^{•-} + SO_4^{2-} + Fe^{3+} \quad (1)$$

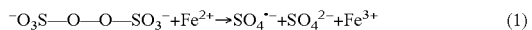

Sulfate radicals can then react with water to generate hydroxyl radical ($OH^•$):

$$SO_4^{•-} + H_2O \rightarrow OH^• + SO_4^{2-} \quad (2)$$

In addition to sulfate radicals and hydroxyl radicals, reductants or nucleophiles (e.g., superoxide ($O_2^{•-}$) or alkyl radicals) have been detected in activated persulfate systems.

There are certain limitations of using iron (II) to activate persulfate. First, the iron (III) that forms in reaction (1) precipitates as an iron hydroxide at pH>4. As a result, an acidic medium is needed to start and/or sustain the activation. Secondly, unlike CHP systems in which iron (III) is reduced to iron (II) after formation, iron (III) is stable in persulfate systems, and thus the initiation reaction may stall.

It is also believed that a base (e.g. sodium hydroxide, a strong base) can activate persulfate by first promoting base-catalyzed hydrolysis of persulfate to form hydroperoxide ($^-O_3S$—O—O—$SO_3^-H^+$) which then reduces another persulfate molecule to form a sulfate radical and a sulfate anion. Oxidation of hydroperoxides results in the formation of superoxide. Although such a system has the potential to be highly reactive, base-activated persulfate reaction is very slow. Also, base-activated persulfate reaction eventually stalls, resulting in failure of the ISCO system. Though persulfate has potentials as an ISCO oxidant, conventional persulfate activation techniques may not be effective.

The present technology is directed to activation of a peroxygen compound (e.g., sodium persulfate) or mixtures thereof in an oxidation system containing an oxygenated organic compound. In particular, embodiments of the present technology use an oxygenated organic molecule (e.g., sugar) as an activator to initiate, maintain, and/or propagate degradation or decomposition of the peroxygen compound. As a result, reactive radicals may be formed for oxidation of chemical contaminants such as VOCs, SVOCs, herbicides and pesticides in contaminated soils and water.

The present technology may be applied in remediation of earth, sediment, clay, rock, and the like (hereinafter collectively referred to as "soil") and groundwater (i.e., water found underground in cracks and spaces in soil, sand and rocks), process water (i.e., water resulting from various industrial processes), or wastewater (i.e., water containing domestic or industrial waste) contaminated with VOCs, SVOCs, pesticides, herbicides, and/or other contaminants. In addition, the present technology may also be applied to degrade contaminants in sludge, sand, and/or tars.

FIG. 1 is a flowchart illustrating a process 100 for oxidizing a contaminate In accordance with embodiments of the present technology. As shown in FIG. 1, the process 100 includes contacting the contaminant with a oxidation system comprising a peroxygen compound at stage 102. The contaminant may be present in an environmental medium including soil, groundwater, process water, and/or wastewater. As used herein, a "peroxygen compound" generally refers to a chemical compound having at least one oxygen-oxygen single bond.

The peroxygen compound can be generally water soluble and include at least one of sodium persulfate, potassium persulfate, ammonium persulfate, other monopersulfates and dipersulfates, and mixtures thereof. The concentration of the peroxygen compound can be about 0.5 mg/L to about 250,000 mg/L, or other suitable values based on particular treatment application. In one particular example, sodium persulfate ($Na_2S_2O_8$) can be introduced into contaminated soil or other environmental media. In other embodiments, a mixture containing persulfate ($Na_2S_2O_8$) can be introduced into contaminated soil or other environmental media.

As shown in FIG. 1, the process 100 also includes activating the peroxygen compound with an oxygenated organic compound at stage 104. The phrase "oxygenated organic compound" is used herein to refer to a monomeric or oligomeric carbon containing compound having at least one of an alcohol, ketone, carboxylic acid, ester, anhydride, or other oxygen bearing functional groups. Examples of oxygenated organic compound can include sugars (e.g., glucose, fructose, lactose, and galactose), carbohydrates, acetone, sodium pyruvate, pyruvate acid, citrate, 1-propanol, 2-propanol, t-butyl alcohol, formaldehyde, 2-butanone, 2-pentanone, 2-heptanone, oxalic acid, acetoacetic acid, malic acid, succinic acid, 1-pentanol, 2-pentanol, 3-pentanol, acetaldehyde, propionaldehyde, butyraldehyde, levulinic acid, isobutanol, and mixtures thereof.

In certain embodiments, a mole ratio of the peroxygen compound to oxygenated organic compound can be about from 1:1000 to about 1000:1. In other embodiments, the mole ratio can be from about 500:1 to about 1:500, about 250:1 to about 1:250, about 100:1 to about 1:100, about 50:1 to about 1:50, about 1:20 to about 20:1, or other suitable values. Optionally, in certain embodiments, a pH modifier may also be introduced at stage 105. The pH modifier may include an acid, a base, a buffer, and/or other suitable compounds or compound mixtures capable of maintaining a target pH (e.g., greater than about 10) in an environmental medium. In other embodiments, the pH modifier may be omitted.

The process 100 can then include decomposing the peroxygen compound to generate oxidizing radicals at stage 106. Based on conducted experiments discussed below, the inventor has recognized that the oxygenated organic compound can activate and/or otherwise facilitate decomposition of the peroxygen compound. In one example, sugar was observed to activate the decomposition of a persulfate salt to generate sulfate radicals as follows:

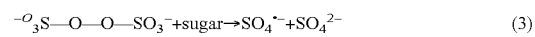

$$^-O_3S-O-O-SO_3^-+sugar \rightarrow SO_4^{\cdot-}+SO_4^{2-} \qquad (3)$$

The generated sulfate radical can then react with water to generate hydroxyl radical ($OH^\cdot$) as discussed above in reaction (2). In addition, other oxidizing radicals, reductants, or nucleophiles (e.g., superoxide or alkyl radicals) may also be generated.

The process 100 can then include oxidizing the contaminant with the generated oxidizing radicals. Example contaminants that may be oxidized can include chlorinated solvents such as trichloroethylene (TCE), vinyl chloride, tetrachloroethylene (PCE), methylene chloride, 1,2-dichloroethane, 1,1,1-trichloroethane (TCA), carbon tetrachloride, chloroform, chlorobenzenes. Other example VOCs and SVOCs that may be oxidized with embodiments of the oxidation system can include benzene, toluene, xylene, ethyl benzene, ethylene dibromide, methyl tertiary butyl ether, polyaromatic hydrocarbons, polychlorinated biphenyls, pesticides and/or herbicides phthalates, 1,4-dioxane, nitrosodimethyl amine, chlorophenols, chlorinated dioxins and furans, petroleum distillates (e.g., gasoline, diesel, jet fuels, fuel oils).

In certain embodiments, oxidizing the contaminant may be carried out in situ, i.e., in the physical environment where the contaminant(s) are found. In other embodiments, oxidizing the contaminant may be carried out ex situ by removing a contaminated medium from an original location and treating the removed contaminated medium at a different location. In any of the foregoing embodiments, contacting the contaminant can include injecting the peroxygen compound and/or the oxygenated organic compound into the contaminated medium.

In any of the foregoing embodiments, the amount of the introduced peroxygen compound and/or oxygenated organic compound may be adjusted to reduce the concentration of the contaminants in the environmental medium to a desired level. In certain embodiments, oxidizing the contaminant can also include adjusting an injection rate of the peroxygen compound based upon hydrogeological conditions of the contaminated medium, e.g., the ability of the oxidation system to displace, mix, and disperse with existing groundwater and move through the contaminated medium. In other embodiments, the injection rate may also be adjusted to satisfy an oxidant demand and/or chemical oxidant demand of the contaminated medium. In further embodiments, the injection rate may be adjusted based on other suitable conditions.

Even though the process 100 in FIG. 1 is shown as having activating decomposition of the peroxygen compound with the oxygenated organic compound subsequent to contacting contaminant with the peroxygen compound, in other embodiments, the oxygenated organic compound may be introduced into the environmental medium to active the peroxygen compound in combination with the peroxygen compound, sequentially before, or in repeated sequential applications to the peroxygen compound introduction. In further embodiments, the peroxygen compound and the oxygenated organic compound may be combined into a stable form (e.g., granule, powder, or other solid form) and prepared before introduction into the medium by adding a solvent (e.g., water) or other suitable compounds.

EXPERIMENTS

Sodium hydroxide (reagent grade, 98%), sodium bicarbonate, nitrobenzene, potato starch, and hexane (>98%) were obtained from J.T. Baker (Phillipsburg, N.J.). Sodium persulfate ($Na_2S_2O_8$) (reagent grade, >98%), magnesium chloride ($MgCl_2$) (99.6%), and hexachloroethane (HCA) (99%) were obtained from Sigma Aldrich (St. Louis, Mo.). A purified solution of sodium hydroxide was prepared by adding 5-10 mM of $MgCl_2$ to 1 L of 8 M NaOH, which was then stirred for a minimum 8 hours and passed through a 0.45 µM membrane filter. Sodium thiosulfate (99%), potassium iodide, methylene chloride, and mixed hexanes were purchased from Fisher Scientific (Fair Lawn, N.J.). Deionized water was purified to >18 MΩ·cm. Nitrobenzene, which has a high reactivity with hydroxyl radicals ($k_{OH\bullet}=3.9\times10^9$ $M^{-1}s^{-1}$) and negligible reactivity with sulfate radicals ($k_{SO_4^{\bullet-}}=\leq 10^6$ $M^{-1}s^{-1}$), was used to detect hydroxyl radicals. HCA was used as a reductant probe.

All reactions were conducted in 20 mL borosilicate vials capped with polytetrafluoroethylene (PTFE) lined septa. Each reaction vial contained sodium persulfate, an oxygenated organic compound (e.g., glucose) used as an activator, and the selected probe (1 mM of nitrobenzene or 2 µM of hexachloroethane). Some reactions contained a strong base (e.g. NaOH). At selected time points, sodium persulfate was measured using iodometric titrations, and the residual probe concentration was analyzed with gas chromatography (GC) after extracting the contents of the reactor with hexane.

Hexane extracts were analyzed for nitrobenzene using a Hewlett Packard Series 5890 GC with a 0.53 mm (id)×15 m SPB-5 capillary column and flame ionization detector (FID). Chromatographic parameters included an injector temperature of 200° C., detector temperature of 250° C., initial oven temperature of 60° C., program rate of 30° C./min, and a final temperature of 180° C. Hexane extracts were analyzed for HCA using a Hewlett Packard Series 5890 GC with electron capture detector (ECD) by performing splitless injections onto a 0.53 mm (id)×30 m Equity-5 capillary column. Chromatographic parameters included an injector temperature of 220° C., detector temperature of 270° C., initial oven temperature of 100° C., program rate of 30° C./min, and a final temperature of 240° C. A 6-point calibration curve was developed using known concentrations of nitrobenzene or hexachloroethane solutions respectively. Sodium persulfate concentrations were determined by iodometric titration with 0.01 N sodium thiosulfate.

Figure 2A:
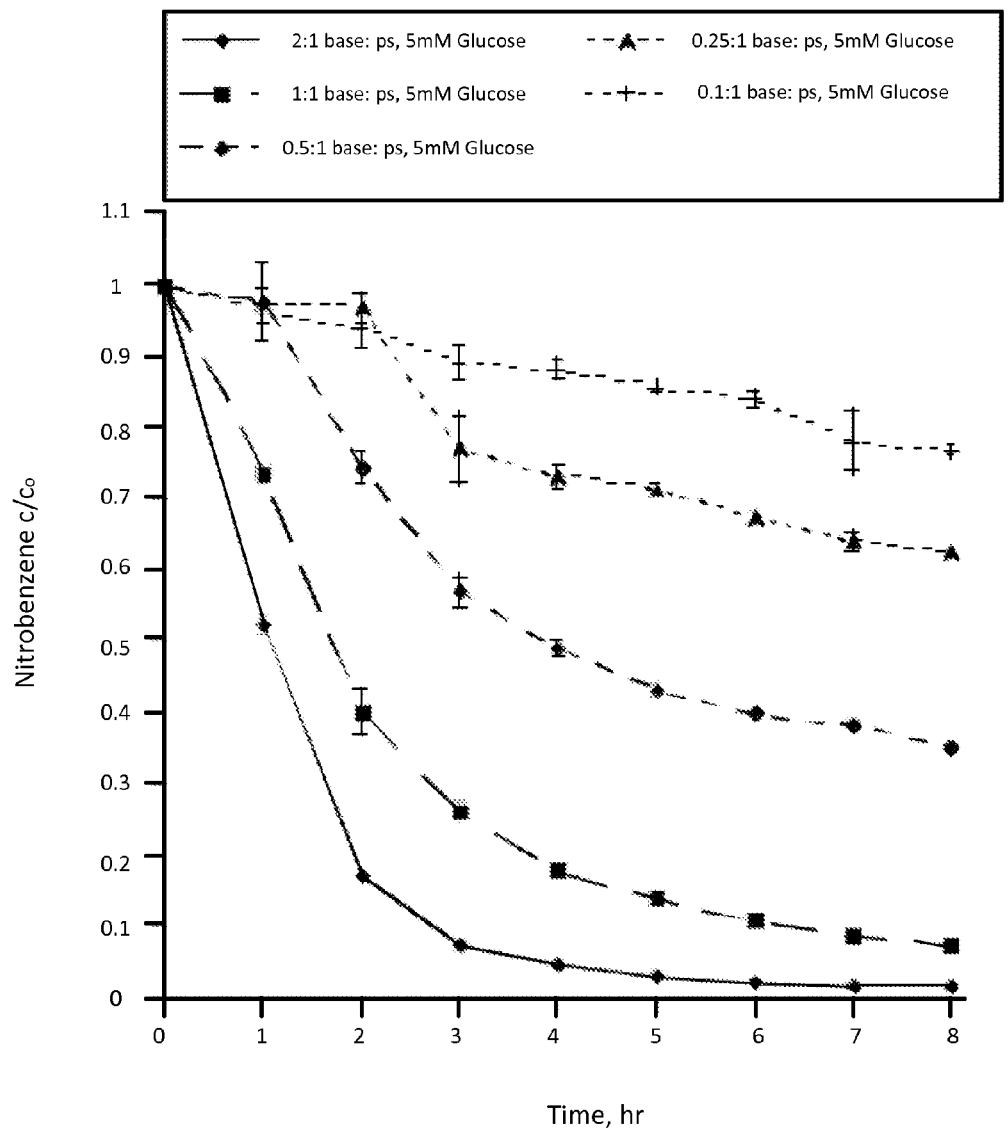
FIG. 2a is a plot showing degradation of nitrobenzene as an hydroxyl radical probe using various base-persulfate ratios with 5 mM glucose addition in accordance with embodiments of the technology.
Figure 2B:
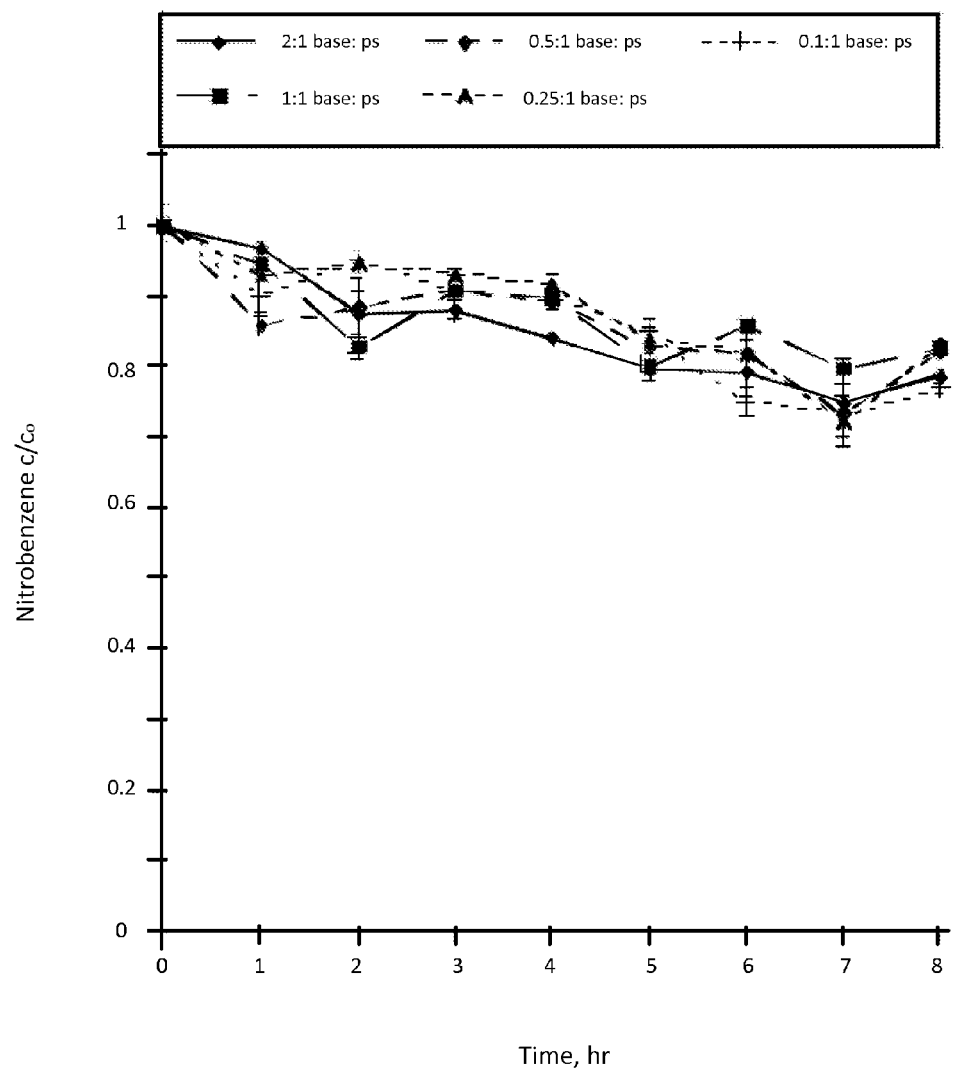
FIG. 2b is a plot showing degradation of nitrobenzene as an hydroxyl radical probe using various base-persulfate ratios without glucose addition in accordance with embodiments of the technology.

The results of FIGS. 2a-7 demonstrate that the reactivity of persulfate can be enhanced (and controlled) by the addition of an oxygenated organic compound as an activator. FIG. 2a shows hydroxyl radical generation (quantified through nitrobenzene degradation) for a range of base to persulfate ratios. As shown in FIG. 2a, persulfate activation increased with increasing basicity; however, glucose activation of persulfate was significant even with minimal base addition. FIG. 2b shows hydroxyl radical generation in systems containing a base and no glucose addition. As shown in FIG. 2b, minimal persulfate activation was observed when no glucose was added.

Figure 3:
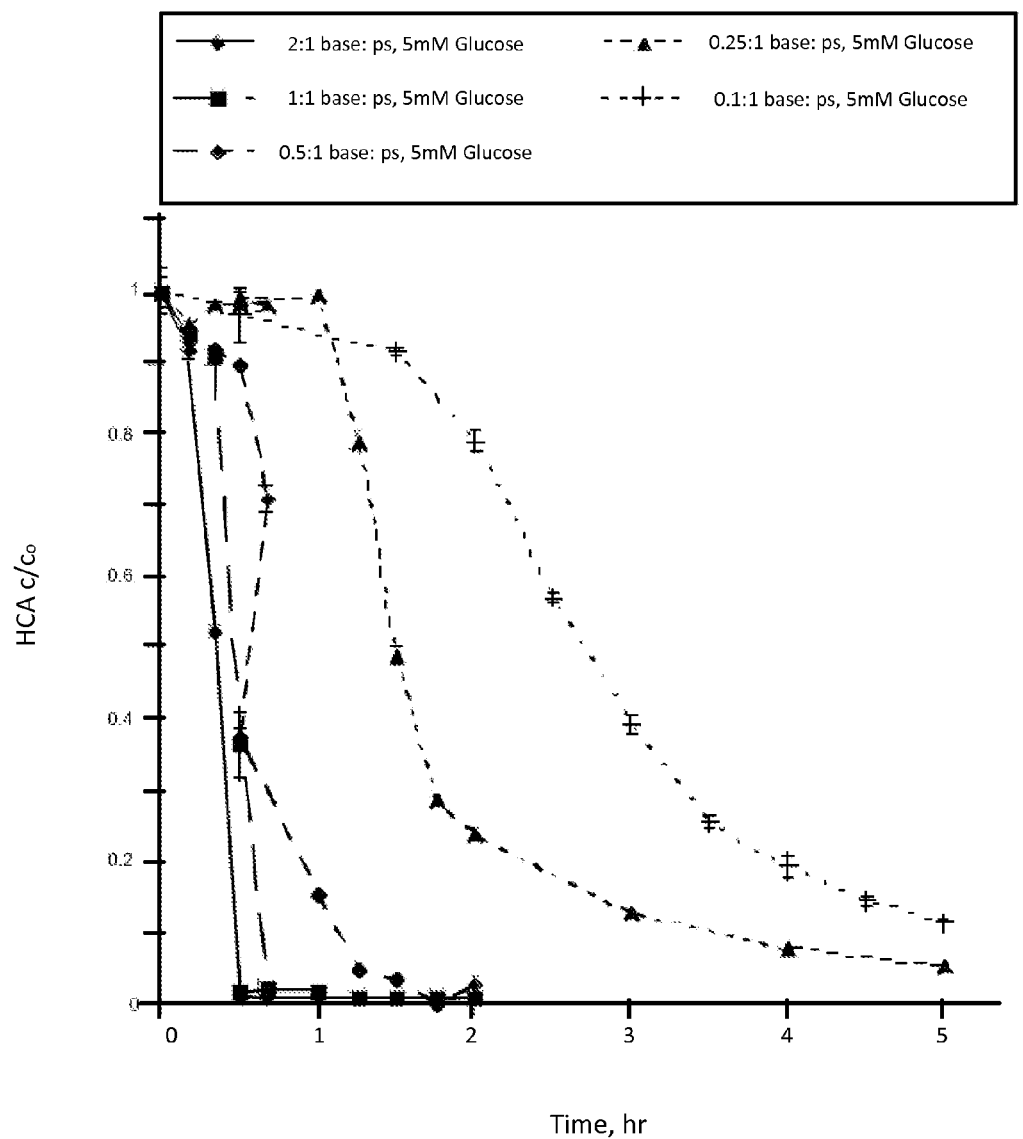
FIG. 3 is a plot showing degradation of hexachloroethane (HCA) as a nucleophile/reductant probe using various base-persulfate ratios with 5 mM glucose addition in accordance with embodiments of the technology.

The results demonstrated that the addition of glucose resulted in increased degradation of the hydroxyl radical probe nitrobenzene, relative to base-activated persulfate. Even more surprising results were found using the reductant probe hexachloroethane (HCA) as shown in FIG. 3. As shown in FIG. 3, reductants such as superoxide or alkyl radicals were generated by glucose activation of persulfate.

Figure 4:
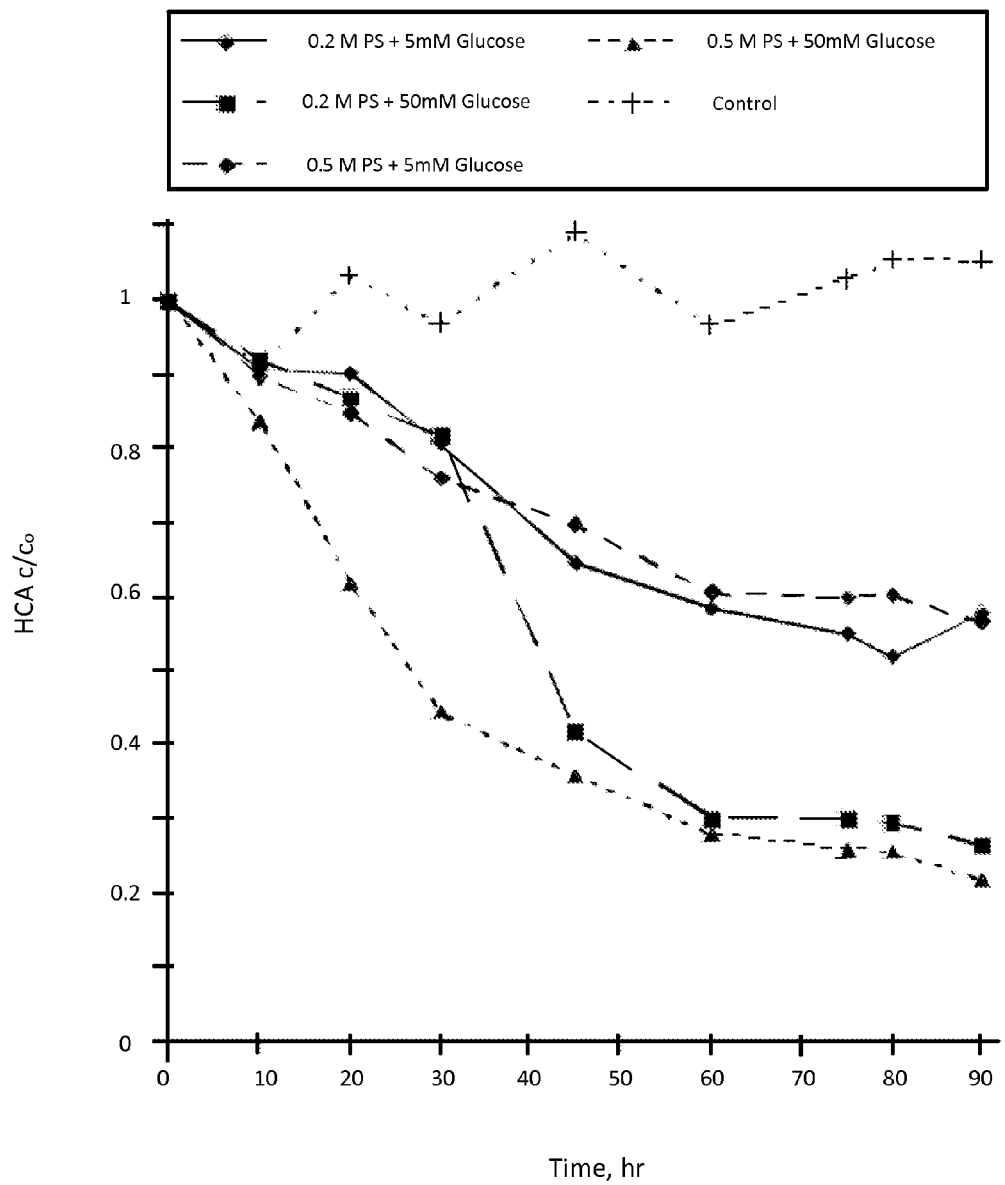
FIG. 4 is a plot showing degradation of HCA as a nucleophile/reductant probe using various base-persulfate ratios without addition of a base in accordance with embodiments of the technology.
Figure 5:
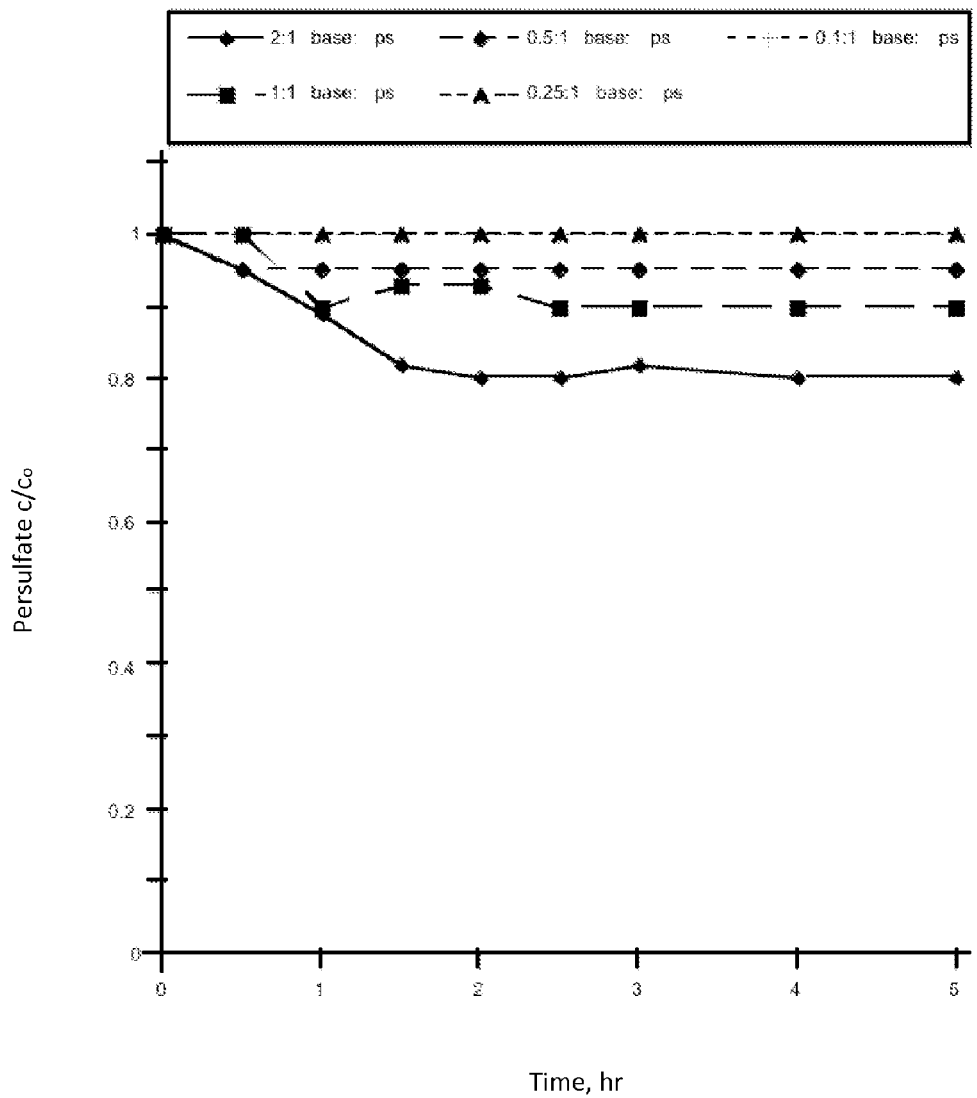
FIG. 5 is a plot showing persulfate degradation at various base to persulfate ratios with 5 mM glucose addition in accordance with embodiments of the technology.
Figure 6:
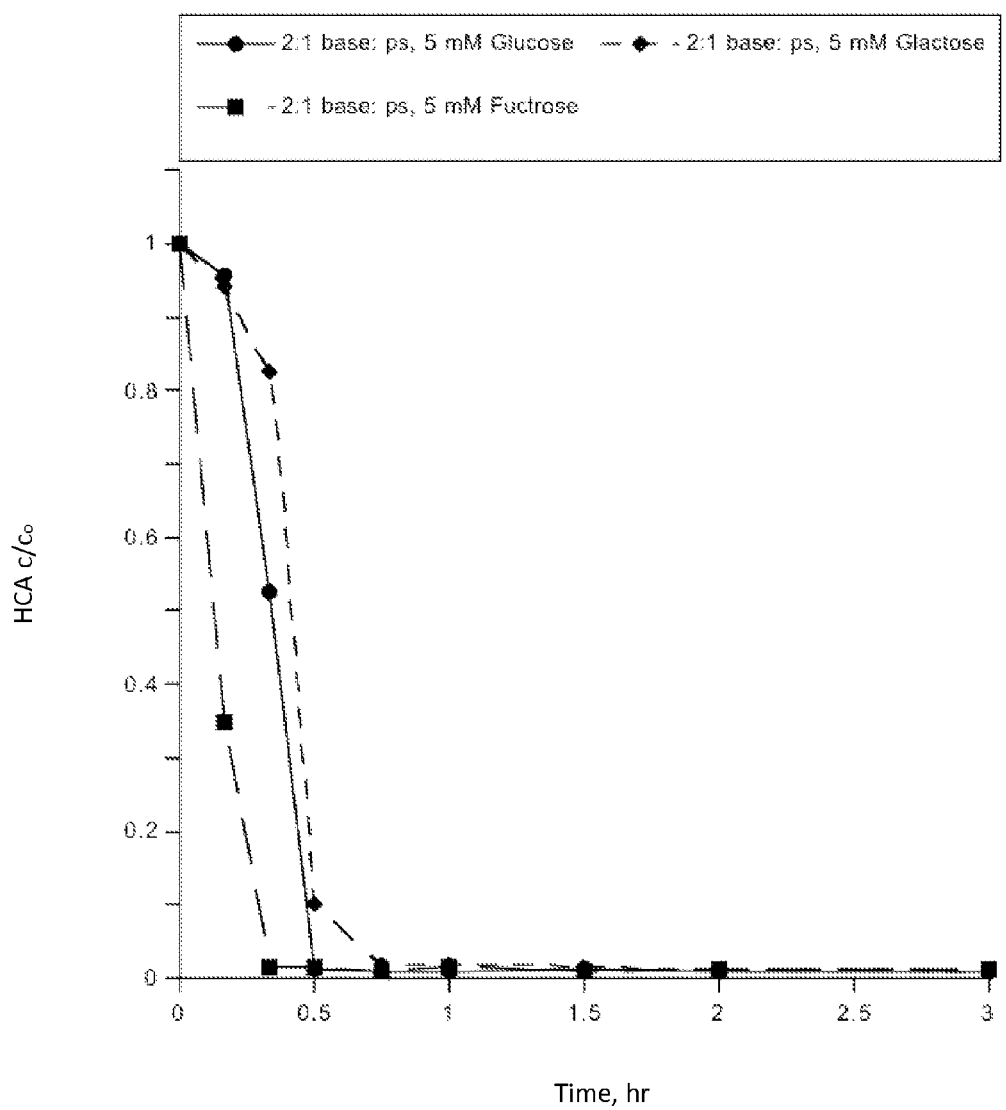
FIG. 6 is a plot showing degradation of hexachloroethane as a nucleophile/reductant probe with additions of glucose, fructose, and galactose in accordance with embodiments of the technology.
Figure 7:
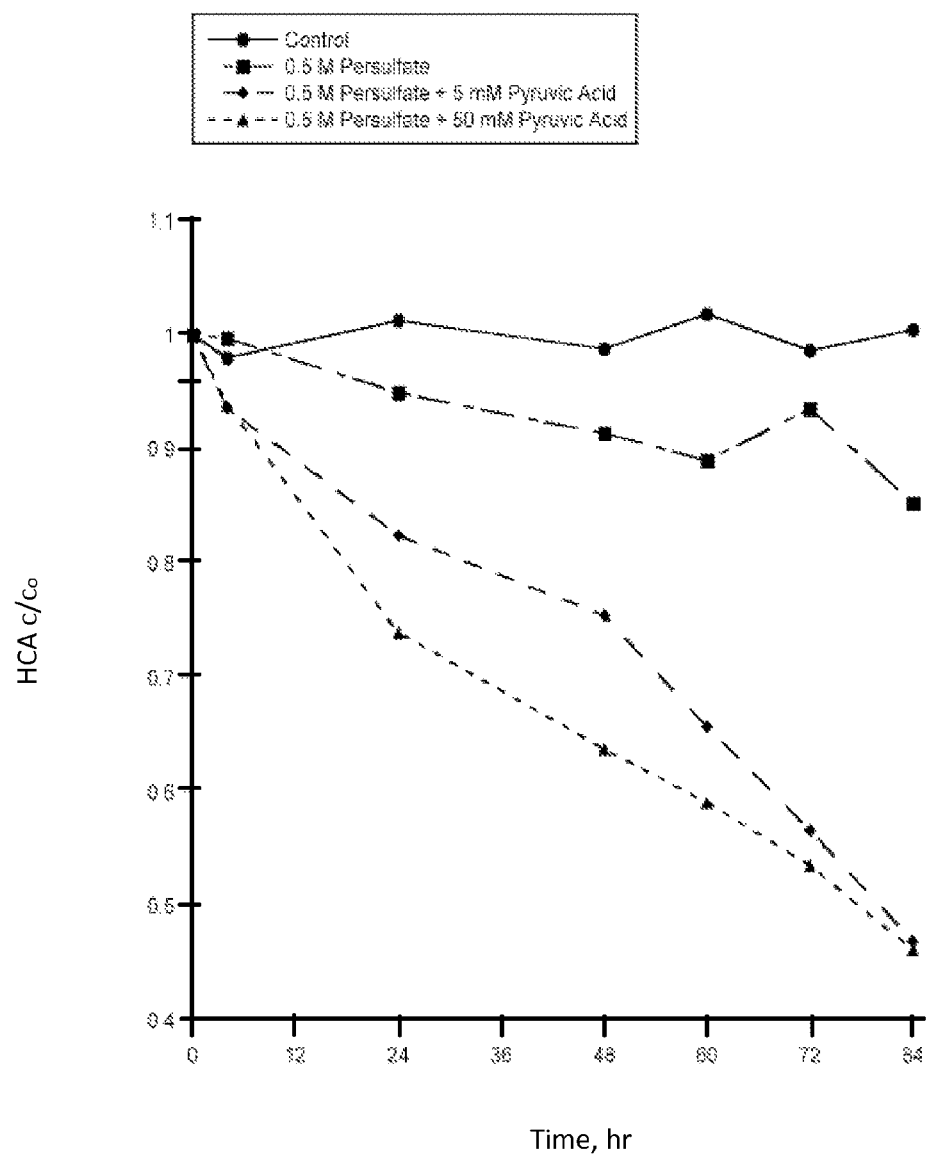
FIG. 7 is a plot showing degradation of HCA as a nucleophile/reductant probe by pyruvate-activated persulfate at neutral pH in accordance with embodiments of the technology.

Degradation of the nucleophile/reductant probe hexachloroethane with persulfate and glucose addition, but without the addition of base, is shown in FIG. 4. The glucose-activated persulfate system is effective without pH adjustment, although some base might be needed to maintain pH neutrality. The decomposition of persulfate in glucose-activated persulfate systems is shown in FIG. 5. The results demonstrate that higher glucose amounts may not consume large masses of persulfate. Degradation of the nucleophile/reductant probe hexachloroethane with additions glucose, fructose and galactose is shown in FIG. 6. The results demonstrate that glucose, fructose, and galactose are all effective in activating persulfate.

Pyruvate was also investigated as a keto acid for activation of persulfate at neutral pH. Hexachloroethane was used as a nucleophile/reductant probe in aqueous solutions containing 0.5 M persulfate and 5 mM pyruvate and 0.5 M persulfate and 50 mM pyruvate. Control systems included hexachloroethane in deionized water and in 0.5 M persulfate without the addition of pyruvate. All systems were adjusted to pH 7. The results, shown in FIG. 7, demonstrate that pyruvate activates persulfate at neutral pH using both 5 mM and 50 mM pyruvate. Furthermore, it is also believed that a rate of persulfate activation is inversely proportional to the chain length of a keto acid. As such, the rate of persulfate activation can potentially be controlled by selecting the appropriate keto acid as an activator.

From the foregoing, it will be appreciated that specific embodiments of the technology have been described herein for purposes of illustration, but that various modifications may be made without deviating from the disclosure. In addition, many of the elements of one embodiment may be combined with other embodiments in addition to or in lieu of the elements of the other embodiments.

We claim:

1. A method for oxidizing a contaminant present in a medium including sediment, soil, rock groundwater, wastewater, or process water, the method comprising:
   contacting the contaminant in the medium with a persulfate salt;
   activating decomposition of the persulfate salt with at least one of glucose, fructose, lactose, or galactose;
   decomposing the persulfate salt to release sulfate radicals as follows:

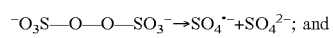
   $$^-O_3S\text{—}O\text{—}O\text{—}SO_3^- \rightarrow SO_4^{\bullet-} + SO_4^{2-}; \text{ and}$$

oxidizing the contaminant with at least the released sulfate radicals,
   wherein the step of activating decomposition of the persulfate salt is performed using a strong base to persulfate molar ratio of 0.1:1 to 2:1.

2. The method of claim 1, wherein said oxidizing step includes reacting at least some of the released sulfate radicals with water to generate hydroxyl radicals (OH˙) as follows:

$$SO_4^{\cdot-} + H_2O \rightarrow OH^{\cdot} + SO_4^{2-}.$$

3. The method of claim 1, wherein said oxidizing step includes reacting at least some of the released sulfate radicals with water to generate hydroxyl radicals (OH˙) as follows:

$$SO_4^{\cdot-} + H_2 \rightarrow OH^{\cdot} + SO_4^{2-};$$ and oxidizing the contaminant with the generated hydroxyl radicals.

4. The method of claim 1, wherein said oxidizing step includes reacting at least some of the released sulfate radicals with water to generate hydroxyl radicals (OH˙) as follows:

$$SO_4^{\cdot-} + H_2O \rightarrow OH^{\cdot} + SO_4^{2-};$$

generating superoxide and/or alkyl radicals with at least some of the released sulfate radicals; and oxidizing the contaminant with at least one of the released sulfate radicals, the hydroxyl radical, and the generated superoxide and/or alkyl radicals.

5. The method of claim 1 wherein activating decomposition of the persulfate salt includes activating decomposition of the persulfate salt with said at least one of glucose, fructose, lactose, or galactose having a mole ratio of persulfate salt to said at least one of glucose, fructose, lactose, or galactose of about from 1:1000 to about 1000:1.

6. The method of claim 1 wherein activating decomposition of the persulfate salt includes activating decomposition of the persulfate salt with said at least one of glucose, fructose, lactose, or galactose having a mole ratio of persulfate salt to said at least one of glucose, fructose, lactose, or galactose of about from 1:20 to about 20:1.

7. The method of claim 1 wherein contacting the contaminant includes contacting the contaminant with at least one of sodium persulfate, potassium persulfate, or ammonium persulfate.

8. The method of claim 1 wherein:
contacting the contaminant includes contacting the contaminant with at least one of sodium persulfate, potassium persulfate, or ammonium persulfate; and
activating decomposition of the persulfate salt includes activating decomposition of the persulfate salt with glucose.

9. The method of claim 1 wherein contacting the contaminant includes injecting the persulfate salt into the medium, and wherein the method further including adjusting an injection rate of the persulfate salt based upon an hydrogeological condition of the medium.

10. The method of claim 1 wherein all steps are performed in situ in soil with groundwater.

11. The method of claim 1 wherein the contaminant is selected from the group consisting of volatile organic compounds, semi-volatile organic compounds, non-halogenated and halogenated solvents, polyaromatic hydrocarbons, total petroleum hydrocarbons, polychlorinated biphenyls, chlorinated benzenes, gasoline additives, and pesticides.

12. A method for oxidizing a contaminant selected from the group consisting of volatile compounds, semi-volatile organic compounds, non-halogenated and halogenated solvents, polyaromatic hydrocarbons, total petroleum hydrocarbons, polychlorinated biphenyls, chlorinated benzenes, gasoline additives, and pesticides, the method comprising:

contacting the contaminant in a medium with a persulfate compound;
decomposing the persulfate compound using at least one of glucose, fructose, lactose, or galactose;
releasing sulfate radicals from the decomposed persulfate compound; and
oxidizing the contaminant with at least the released sulfate radicals,
wherein the step of contacting the contaminant includes activating the persulfate compound for decomposition using a strong base to persulfate molar ratio of 0.1:1 to 2:1.

13. The method of claim 12 wherein oxidizing the contaminant includes oxidizing the contaminant present in soil sludge, sediment, bedrock, groundwater, process water or wastewater.

14. The method of claim 12, further comprising introducing a pH modifier into the medium and achieving a target pH value with the introduced pH modifier.

15. The method of claim 12 wherein contacting the contaminant in the medium with a persulfate compound includes contacting the contaminant in the medium with a dipersulfate, a dipersulfate salt, or a mixture thereof.

16. The method of claim 12 wherein contacting the contaminant in the medium with a persulfate compound includes contacting the contaminant in the medium with a monopersulfate, a monopersulfate salt, or a mixture thereof.

17. The method of claim 12, further comprising introducing a base into the medium and in contact with the persulfate compound and said at least one of glucose, fructose, lactose, or galactose.

18. The method of claim 12 wherein all steps are performed in situ in soil with groundwater.

19. A method for oxidizing a contaminant, the method comprising:
contacting the contaminant with a peroxygen compound comprising persulfate; and
initializing, maintain, or propagating degradation of the peroxygen compound with at least one of glucose, fructose, lactose, or galactose, thereby releasing oxidizing radicals; and
oxidizing the contaminant with the released oxidizing radicals,
wherein the initializing, maintaining, or propagating step includes activating the peroxygen compound for degradation using a strong base to persulfate molar ratio of 0.1:1 to 2:1.

20. The method of claim 19 wherein:
contacting the contaminant includes introducing the peroxygen compound into a medium containing the contaminant; and
initializing, maintaining, or propagating degradation of the peroxygen compound includes introducing said at least one of glucose, fructose, lactose, or galactose in combination with, sequentially before, sequentially after, or in repeated sequential applications to introducing the peroxygen compound.

21. The method of claim 19 wherein initializing, maintaining, or propagating degradation of the peroxygen compound includes initializing, maintaining, or propagating degradation of the peroxygen compound with glucose.

22. The method of claim 19 wherein:
contacting the contaminant includes injecting the peroxygen compound into a medium containing the contaminant; and
the method further includes adjusting an injection rate of the peroxygen compound to satisfy an oxidant demand and/or chemical oxidant demand of the medium containing the contaminant.

23. The method of claim 19 wherein the medium includes sediment, soil, rock, groundwater, wastewater, or process water, and wherein the contaminant is selected from the group consisting of volatile organic compounds, semi-volatile organic compounds, non-halogenated and halogenated solvents, polyaromatic hydrocarbons, total petroleum hydrocarbons, polychlorinated biphenyls, chlorinated benzenes, gasoline additives, and pesticides.

24. The method of claim 19 wherein all steps are performed in situ in soil with groundwater.

* * * * *